Nov. 10, 1970 J. D. DONNA 3,539,975

FABRICATION IN ELECTRICAL TERMINAL CONNECTIONS

Filed Sept. 16, 1968

INVENTOR.
JOSEPH D. DONNA

BY [signature]
ATTORNEY

United States Patent Office 3,539,975
Patented Nov. 10, 1970

3,539,975
FABRICATION IN ELECTRICAL TERMINAL CONNECTIONS

Joseph D. Donna, Minneapolis, Minn., assignor to Honeywell Inc., Minneapolis, Minn., a corporation of Delaware Filed Sept. 16, 1968, Ser. No. 762,293
Int. Cl. H01r *13/50;* H05k *1/07*
U.S. Cl. 339—176 3 Claims

ABSTRACT OF THE DISCLOSURE

A multiple terminal electrical connector, such as electrical connectors for printed circuit boards, has a series of terminals and to each terminal an electrical wire, as conventional, may be soldered. The soldered terminals may be insulated from each other to provide a reliable insulated connection that herein is quickly provided by the application to all terminals at once of insulation. Such insulation is provided by a preformed member resembling a double comb in this instance, having a longitudinally extending main portion with side portions or teeth extending therefrom wherein the two adjacent side portions or teeth along with the main portions serve to isolate terminals with their soldered connection from adjacent terminals.

The invention herein described was made in the course of or under a contract or subcontract thereunder with the United States Air Force.

SUMMARY OF THE INVENTION

This invention relates to multiple terminal electrical connectors such as printed circuit board electrical connectors and to a method of quickly fabricating connections therefor, and providing reliable insulated multiple electrical connections for such connector.

The invention, for illustration of an application thereof, may be considered with respect to a conventional printed circuit board connector. Such printed circuit board connector have in some cases parallel rows of terminals or soldering lugs, each row having a number of such terminals to each of which a wire may be soldered.

To such connector is applied a preformed insulating member constructionally similar to a double comb having two rows of teeth on opposed sides of a central longitudinal portion which portion is to lie between rows of terminals of the printed circuit board with the teeth or lateral portions lying between adjacent terminals of the printed circuit board. The insulating members are only of a sufficient thickness that with a member held in alignment with a space between the two rows of terminals and also held with both rows of teeth in a plane parallel to the rows of terminals of the connector, the member with the lower row of teeth thereof in contact or close to the connector, may be slid along the space between the two rows until the end tooth or lateral portion extends beyond the last tooth. Thereafter, the member may be rotated through ninety degrees and placed with the teeth thereof, except the end teeth, between adjacent terminals of the connector and the central portion between the rows of teeth.

Sufficient insulating members may be inserted between rows of terminals until the desired extent of insulation is provided. A member may be permanently retained in position by cementing its ends to the connector or to an adjacent member.

Further details of the invention are supplied in the accompanying description along with the attached drawings, wherein.

As an illustration of the application of the invention to multiple terminal electrical connectors, the invention in a novel method of fabricating electrical connections to a multiple terminal connector has been applied to a form of printed circuit board connector shown in Pat. 2,875,-425.

Figure 1:
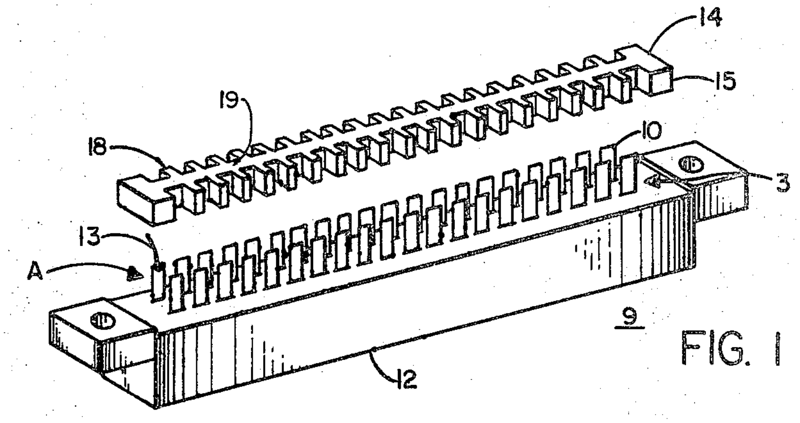
FIG. 1 shows a top view of the electrical connector used for a printed circuit board and the insulating member positioned above the board.

Referring to FIG. 1, there are shown parallel rows of terminals or soldering lugs 10, 10 extending upwardly from the body of the connector 9. In the particular connector, there are two parallel rows of lugs shown, one row referred to as an "A" row and the second as a "B" row. Each row contains approximately forty soldering lugs or terminals 10, extending from an insulated body 12 of the connector.

The side of the connector opposite that of the soldering lugs has an opening or socket (not shown) for receiving the printed circuit board. An electrical conductor 13 may be soldered or welded to each of the terminals or lugs 10 in the two parallel rows.

Figure 2:
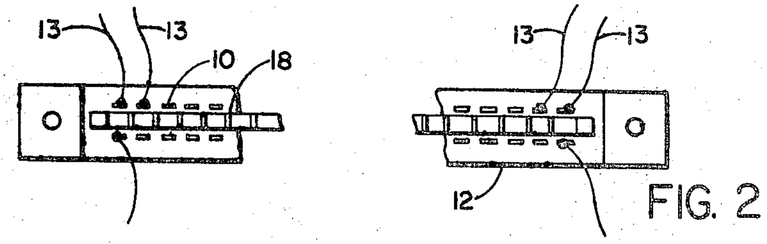
FIG. 2 shows a top view of the board with the insulating member placed in full position between the rows.
Figure 3:
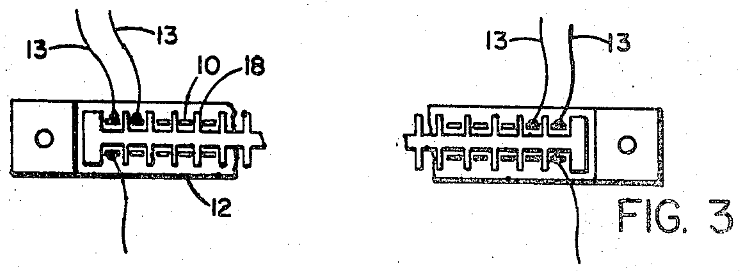
FIG. 3 shows a top view of the preformed insulator rotated ninety degrees from FIG. 2 and in final position.
Figure 4:
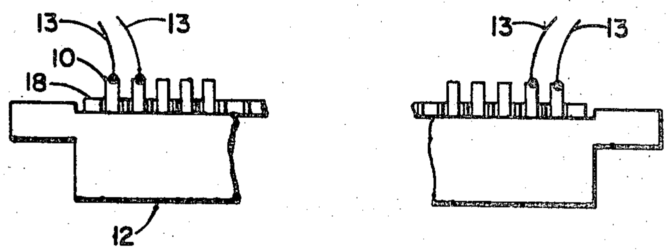
FIG. 4 shows an edge view of the connector with the insulating member in final position.

Following the operation of soldering of the conductors 13 to their respective terminals 10, the second step of the method involves insulating the respective terminals and their conductors from each other. The second step consists in placing an edge 15 of the insulating, serrated edge member 14 between the two "A" and "B" rows of terminals but in contact with the body 12 of the connector. Thus the insulating member 14 will be held in alignment with the space between the two rows of terminals of the connector and will also be held with both rows of teeth or serrations 18 in a plane parallel to the rows of terminals 10 of the connector with the lower row of teeth of the member 14 adjacent or in contact with the connector body 12. Thereafter the member 14 may be slid along the space between the two rows until the end tooth 18 or lateral portion of the insulating member extends beyond the last terminal, as in FIG. 2. Following this step, the member 14 while held generally parallel to the body 12 may be rotated through ninety degrees from the FIG. 2 position and placed with the teeth 18 thereof, except the end teeth, between adjacent terminals of the electrical connector thus quickly insulating the terminal in a row from adjacent terminals in a row and also from terminals in the adjacent row.

Following this insertion of the first member 14, sufficient members may be inserted between the rows "A," "B" of terminals 10 until the desired thickness of insulation is provided.

Each member is then cemented to the body of the connector or its adjacent member so that the member is permanently retained in position to complete the operative steps of the method.

The insulating member 14 may be made of nylon. Its thickness is less than the space between soldered terminals to enable easy insertion between such rows and subsequent rotation through ninety degrees after such insertion to place teeth or serrations 18 so that adjacent terminals 10 are insulated from each other whether such terminals are in the same or in the adjacent row. The overall width of member 14 is such that the teeth extend outwardly beyond the rows "A," "B" of terminals. The teeth are cut to such depth that the longitudinal portion 19 of member 14 lies between the rows when member 14 is in final position.

The advantages of the invention as applied particularly to printed circuit board electrical connectors with respect to reducing production costs will now be evident. Previously, in making an insulated connection between a terminal or soldering lug and conductor, insulation such as "spaghetti" had been initially placed over the conductor following which the soldering action was effected and the insulation slid back over the soldered connection thus a time consuming effort was involved. When working with multiple terminal connectors, instead of insulating a terminal 10 and its conductor 13 one at a time as the soldering action was completed, in the present operation as many as desired of the terminals may be connected to their conductors by a soldering action and following this step the insulation member may be placed into position to effect the insulation for a multiple number of terminals and their conductors at one time.

It is evident that changes in the specific form of the invention as to the outline of the terminals, such as curves rather than rows, may be made within the scope of what is claimed below without departing from the spirit of the invention.

Having described the invention, what is claimed as new and desired to protect by Letters Patent is:

1. A mehtod of fabricating reliable, insulated electrical connections to a multiple terminal electrical connector, said connector comprising plural parallel rows each row containing a multiple number of terminals, comprising:

soldering or otherwise fastening conductors to said terminal;

placing a preformed comblike member on its edge between the rows with the teeth thereof aligned with spacings between the terminals; and rotating the comblike member whereby the teeth approach and engage the space between the terminals.

2. A preformed electrical insulator for a multiple terminal electrical connector, said connector having contacts therein, said contacts being connected to spaced soldering lugs extending beyond a side of the connector and from which wires may extend, said insulator having a width and thickness and being of comblike construction by which channels are formed in the insulator in the direction of the thickness and in the direction of its width, the teeth thereof or side walls of the channels entered to the space between adjacent soldering lugs with the connector side adjacent the portion of the insulator that determines its width, wherein the multiple terminals of the connector comprise a plurality of parallel rows of terminals and the insulator is of a thickness less than the space between rows of terminals to easily insert the insulator between rows of soldered terminals from which wires may extend.

3. In combination with a multiple terminal electrical connector having a body with a socket in one side thereof with contacts therein with soldering lugs or terminals extending from each said contacts beyond the opposite side of said connector body;

electrical conductors soldered or fastened to the connector terminals;

a preformed insulator means of comblike construction having teeth engaged with and thus occupying the space betweew said terminals;

wherein the terminals are arranged in at least two parallel rows, with the preformed insulator means having a thickness considerably less than the space between rows to permit sliding of the insulator means between the rows during the positioning of the teeth between adjacent terminals.

References Cited

UNITED STATES PATENTS 2,702,879 2/1955 Wheeler ............ 321—8
3,221,288 11/1965 Eads ............ 339—176

MARVIN A. CHAMPION, Primary Examiner

L. J. STAAB, Assistant Examiner

U.S. Cl. X.R.

339—17; 29—629